United States Patent [19]

Nakagawa et al.

[11] Patent Number: 4,955,265

[45] Date of Patent: Sep. 11, 1990

[54] WEB CUTTING POSITION CONTROL SYSTEM

[75] Inventors: Hiroshi Nakagawa, Yokohama; Shizuro Tokiwa, Zushi; Kunio Takeuchi, Yokohama, all of Japan

[73] Assignee: Tokyo Kikai Seisakusho Ltd., Tokyo, Japan

[21] Appl. No.: 305,281

[22] Filed: Feb. 1, 1989

Related U.S. Application Data

[63] Continuation-in-part of Ser. No. 97,804, Sep. 16, 1987, abandoned.

[30] Foreign Application Priority Data

Oct. 10, 1986 [JP] Japan ................................ 61-242659

[51] Int. Cl.[5] ........................ B23Q 15/12; B26D 5/20

[52] U.S. Cl. .......................................... 83/74; 83/365; 83/367; 83/371; 226/28

[58] Field of Search .................... 83/76, 365, 367, 371, 83/364, 368, 289, 346, 65, 72, 74; 101/181, 248; 226/2, 24, 28

[56] References Cited

U.S. PATENT DOCUMENTS

| | | | |
|---|---|---|---|
| 1,954,349 | 4/1934 | Dewey et al. | 83/365 X |
| 3,407,690 | 10/1968 | Stanley | 83/371 X |
| 4,070,937 | 1/1978 | Off et al. | 83/371 X |
| 4,384,500 | 5/1983 | Friberg | 83/74 |
| 4,452,140 | 6/1984 | Isherwood et al. | 101/181 |
| 4,519,868 | 5/1985 | Hoffmann | 83/371 X |
| 4,719,575 | 1/1988 | Gnuechtel | 226/28 X |

*Primary Examiner*—Hien H. Phan
*Assistant Examiner*—Eugenia A. Jones
*Attorney, Agent, or Firm*—McGlew & Tuttle

[57] ABSTRACT

A web cutting position control system capable of cutting a web having a print pattern thereon in such a manner as to match the print pattern without limiting the mounting position of a synchronizing mark detecting means for detecting synchronizing marks on the web is disclosed. A counter for counting the rotational pulses, for example, of a cutting cylinder for cutting the web is provided so as to compare the pulse count at the time of synchronizing mark detection with the reference value representing a value at the moment when the web and the cutting cylinder are in normal relative positions, and to control the relative positions of the web and the cutting cylinder to the normal relative positions by controlling the movement of a compensating roller until the two values become equal to each other.

6 Claims, 5 Drawing Sheets

WEB CUTTING POSITION CONTROL SYSTEM

BACKGROUND OF THE INVENTION

Related Case Information

This application is a continuation-in-part application of application Ser. No. 07/097,804 filed Sept. 16, 1987 and now abandoned.

FIELD OF THE INVENTION

This invention generally relates to a web cutting position control system used for cutting a web running out of a rotary press, and more specifically to a web cutting position control system which cuts to a predetermined length a web to which printing and other pretreatments have been applied by automatically adjusting the cutting position of the web so that the cutting operation to a predetermined length can be performed in accordance with the state of the pretreatments.

DESCRIPTION OF THE PRIOR ART

In the fields of food packaging machinery and printing machinery, it has heretofore been practiced that a paper or plastic web, on which the same pattern is repeatedly printed at a predetermined frequency is cut so as to discharge it in the form of cut lengths precisely agreeing with the repeated printed patterns. In such a case, it is necessary to effect control of the process so as to keep cutting the web at an exact cutting position independently of web elongation or shrinkage, or slip in web feeding. Japanese patent publication No. 1004 of 1973 (date of issuance: Mar. 22, 1977) discloses a known arrangement for realizing these functions.

These publications teach transmitting gate signals having a predetermined width n synchronism with the revolution of the cutting cylinder (cutting means). A reference position that provides the timing of cutting operation by the cutting means is set between the gate signals thus produced, or a means for transmitting reference signals for the timing of cutting operation is provided. A synchronizing mark detecting means for transmitting detection signals by detecting synchronizing marks on the web is provided in such a positional relationship that the detection signals fall between the gate signals in order to detect the degree of advancement or delay of the web by comparing the synchronizing mark detection signal appearing between the gate signals with the reference value for the timing of the cutting operation. On the basis of the degree of advancement or delay of the web thus obtained, the web is cut at a desired cutting position by changing the revolution of the cutting cylinder, as a cutting means (the above-mentioned Japan Patent Publication No. 1004 or 1973), or by changing the position of the compensating roller provided in the web feeding path (Japanese Patent Publication No. 10226 or 1977).

However, the web cutting position control systems as disclosed in the prior art are designed to automatically adjust the cutting position of the web in accordance with the results of comparison between the reference for the cutting timing set within the range of gate signals transmitted by the system and the synchronizing mark detection signal. Should the synchronizing mark detection signal deviate from the range of the gate signal, therefore, the subsequent automatic adjustment of the cutting position could be inoperative, resulting in shutdown of the system. In addition, the location of the synchronizing mark detecting means has to be precisely determined in advance so that the synchronizing mark detection signal falls within the range of the gate signal.

SUMMARY OF THE INVENTION

It is an object of this invention to provide a web cutting position control system that is capable of automatically adjusting the cutting position of a web over the full range of movement of a compensating roller by eliminating the problem of the automatic adjustment of the cutting position being limited within the width of the gate signal, as associated with the prior art.

It is another object of this invention to provide a web cutting position control system having great practical usefulness by permitting the location of the synchronizing mark detecting means to be selected freely.

To achieve these objectives, the arrangement of the present invention comprises a cutting cylinder encoder for detecting the rotational angle of the cutting cylinder, a counter for counting the rotational pulses generated by the cutting cylinder encoder, for example, and a synchronizing mark detecting means for detecting synchronizing marks provided on the web. The inventive arrangement has such a construction that the pulse count counted from the time when the counter is reset to the time when counting is discontinued by the detecting output of synchronizing mark detecting means is compared with the predetermined reference value representing the normal positional relationship between the web and the cutting cylinder so that the cutting position of the web is automatically adjusted by determining the direction and amount of movement of the compensating roller having a function of changing the positional relationship between the web and the cutting cylinder, if the pulse count deviates from the reference value, in accordance with the degree and manner of deviation of the pulse count from the reference value.

While a specific embodiment of the invention has been shown and described in detail to illustrate the application of the principles of the invention, it will be understood that the invention may be embodied otherwise without departing from such principles.

BRIEF DESCRIPTION OF THE DRAWINGS

In the Drawings:

FIGS. 7A–7G are schematic descriptive views with FIGS. 7A through C showing movement of paper web and sensing where the value (A) and the reference value (B) are the same while FIGS. 7D–7G show a situation where these values are unequal and then brought into an equal state.

DESCRIPTION OF THE PREFERRED EMBODIMENTS

Figure 1:
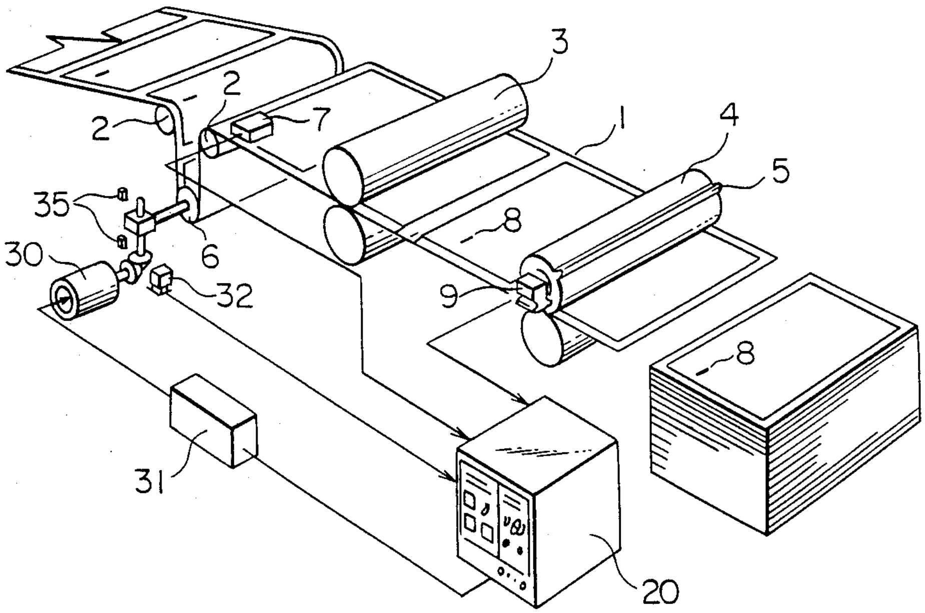
FIG. 1 is a perspective view showing overall construction of the web cutting position control system of the invention.

The overall construction of the web cutting position control system to which this invention is applied is shown in FIG. 1.

In the figure, numeral 1 denotes a web; 2 a guide roller; 3 a drag roller; 4 a cutting cylinder; 5 a cutter; 6 a compensating roller; 7 a synchronizing mark detecting means; 8 a synchronizing mark; 9 a cutting cylinder encoder; 20 a control unit; 30 a compensating roller drive motor; 31 a motor drive circuit; 32 a drive motor encoder; and 35 a limit switch, respectively.

As can be seen in FIG. a drag roller 3 is preferably positioned upstream of a cutting cylinder 4. Although this drag roller is not essential to the invention, such a drag roller is preferable according to the preferred embodiment. The drag roller functions to prevent shear and paper breakage due to paper overlapping. The drag roller continuously tensions the paper as the drag roller has a peripheral speed slightly higher than that of the printing cylinder.

Figure 6:
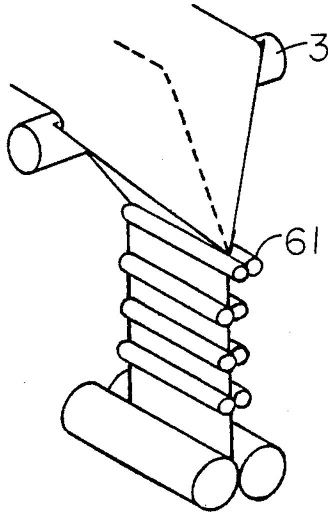
FIG. 6 is a perspective view of a folding arrangement as shown in FIG. 2.
Figure 2:
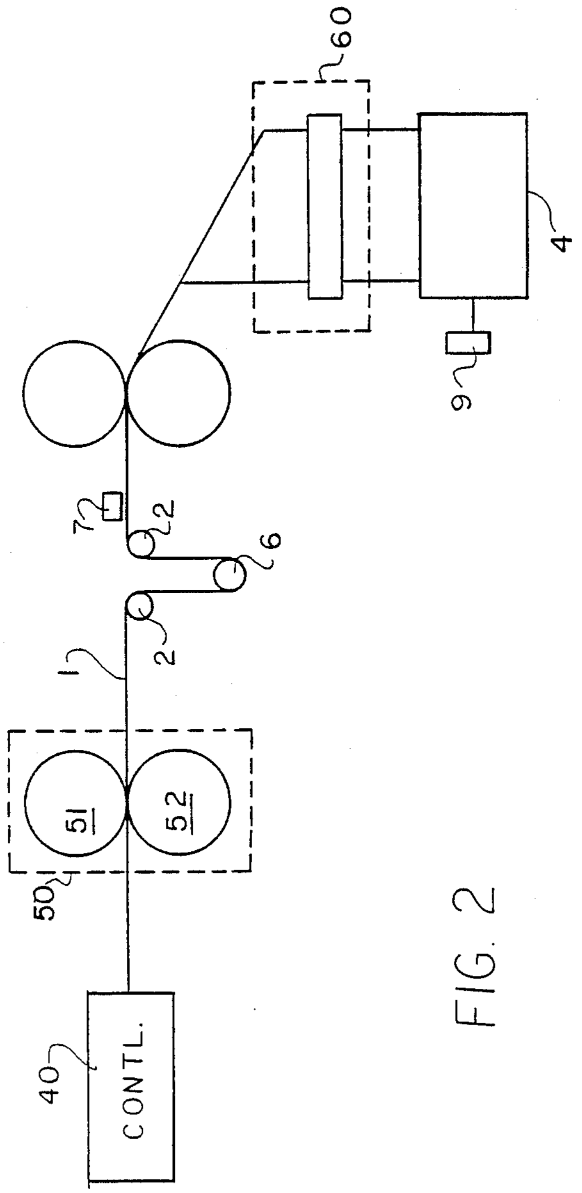
FIG. 2 is a block diagram illustrating the outline of an overall construction of the web cutting position control system of the invention according to FIG. 1 also showing a folder mechanism.

The cutting cylinder is of a standard construction and includes a cutter 5. The cutting cylinder may be positioned downstream of a folder such as the folder 60 shown in FIG. 2. Folder 60 has been taken out of the perspective view 1 for clarity. However, it is contemplated that an arrangement could include a folder 60 as shown in FIG. 2 and as shown in perspective in FIG. 6. The folder advantageously folds the paper web prior to cutting such that the newspaper-type pages folded in two are produced. The folder may include nipping rollers or the like roller as shown as shown in FIG. 6 at 61.

FIG. 1 shows an adjustment roller or compensating roller 6 upstream of the cutting cylinder 4. The roller 6 is a roller to adjust not only the margins that the vertical edges of the printed newspaper page, but also the cutting line for cutting the printed newspaper in the folder. The size of the vertical margins of the traveling paper web tend to change at the time of cutting with changes in tension of the paper web due to machine speed and the state of the paper web. The compensating roller 6 may be moved back and forth to adjust the travelling length of the web. The general concept of such devices is generally known, as, during operation, the web is continuously fed and discharged from the cutting unit or from the folding cutting unit. When the compensating roller 6 is moved in the direction in which the web path is increased, the web may be stretched to some degree. However, as the web keeps running, the stretched web is cut and discharged. Consequently, as the web is continuously fed from the press unit, it gradually extends over an increased web path produced by the movement of the compensating roller 6 (rather than being stretched), and the relationship between the printing position and the cutting position is changed.

As shown in the figure, the web 1 on the surface of which the same pattern is repeatedly printed is fed to the cutting cylinder 4 by the drag roller 3, which acts to stretch the web while being guided by the guide roller 2. At the cutting cylinder 4, the web 1 is cut to a predetermined length by the cutter 5 provided on the cutting cylinder 4 in such a manner as to match the print pattern. Along the web 1 being fed, the compensating roller 6 is provided to move vertically (as shown in FIG. 1) to cause the movement of the web 1 up to the cutting cylinder 4 to change with respect to the cutting cylinder. That is, to change the weo pass length between the press unit 50 and cutting cylinder 4, the relative position between drag roller 3 and the cutting mean 4 remains substantially constant. By controlling the change in the movement of the web 1, the web 1 can be properly cut by returning the positional relationship of the web 1 and the cutting cylinder 4 to a desirable one, even if the positional relationship between the web 1 and the cutting cylinder 4 deviates from the desirable positional relationship due to web elongation or shrinkage, or slip in web feeding.

FIG. 2 is a block diagram illustrating schematically the relative positions or the web 1, the guide roller 2, the drag roller 3, the cutting cylinder 4, the compensating roller 6, the synchronizing mark detecting means 7 and the cutting cylinder encoder 9 in FIG. 1. Numeral 40 denotes a feeder unit; 50 a press unit; 51 and 52 a pair of blanket cylinders for transferring impressions on the web surface; and 60 a folder unit, respectively. As shown in FIG. 2, the web 1 wound on the feeder unit 40 is printed as it passes through a pair of blanket cylinders 51 and 52 of the press unit 50. The web is then passed through the compensating roller 6 to control the movement thereof, folded by the folder unit 60, and cut by the cutting cylinder 4.

In FIG. 1, the control unit 20 controls the movement of the compensating roller 6 so as to compensate for a change, if any, in the relative positions of the web 1 and the cutting cylinder 4. Sensors for detecting changes in the relative positions of the web 1 and the cutting cylinder 4 are the synchronizing mark detecting means 7 and the cutting cylinder encoder 9.

The synchronizing mark detecting means 7 is installed on the downstream side of -he compensating roller 6 to detect the presence or absence of the synchronizing mark 8 printed on the web 1. The synchronizing mark 8 should preferably be printed in advance on each cut length of the web 1, but it is not limited to be a printed mark. Other appropriate types of marks, such as perforations, may serve the purpose. Or, a certain part of the normal print face appearing at a predetermined interval may be used as a synchronizing ng mark, in place of a specially printed mark. The type of the synchronizing mark detecting means 7 is usually selected in accordance with the attributes of the synchronizing mark 8, with the most commonly used type being a photoelectric switch which detects a change in the amount of reflected light from the web 1 and the synchronizing mark 8. The cutting cylinder encoder 9, on the other hand, is an encoder mounted on the rotating shaft of the cutting cylinder 4 serving as a phase detecting means for detecting the rotational angle of the cutting cylinder 4.

Figure 3:
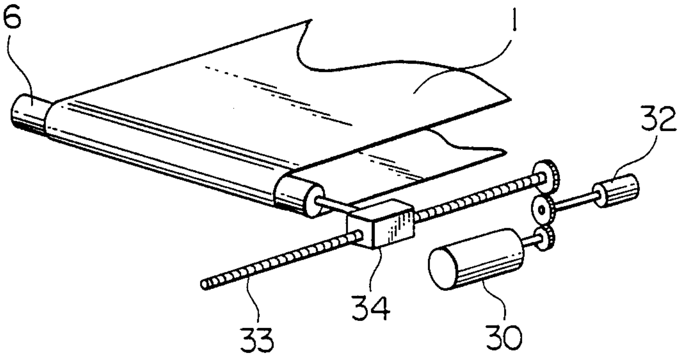
FIG. 3 is a detailed view of assistance in explaining the drive mechanism of the compensating roller shown in FIG. 2 and FIG. 1.

FIG. 3 shows the details of the driving mechanism of the compensating roller 6 that is to be driven by the control signal transmitted by the control unit 20. As shown in the figure, the bearing housing 34 supporting an end of the shaft of the compensating roller 6 via a bearing is screwed onto the guide screw 33. Thus, as the bearing housing 34 travels along the rotating guide screw 33, the compensating roller 6 is moved over the range of the length of the guide screw 33. As shown in FIGS. 1 and 2, the rotation of the guide screw 33 is realized by the compensating roller drive motor 30 which is driven by the control signal transmitted from the control unit 20 via the motor drive circuit 31. In order to feed back the movement of the moving compensating roller to the control unit 20, the drive motor encoder 32 for producing a rotational pulse in accordance with the movement of the compensating roller 6 is provided within a gear system ranging the compensating roller drive motor 30 through the guide screw 33. The limit switch 35 shown in FIG. 1 is provided as a safety device for preventing the bearing housing 34 from disengaging from the guide screw 33.

Next, the construction of the control unit 20 will be described, referring to FIG. 4. As has been described above, the control unit 20 is electrically connected to the synchronizing mark detecting means 7, the cutting cylinder encoder 9, the compensating roller drive motor 30 and the drive motor encoder 32. Thus, the control unit 20 receives a rotational pulse in accordance with the rotational angle of the cutting cylinder 4 from the cutting cylinder encoder 9 and a synchronizing mark detection signal from the synchronizing mark detecting means 7 as the means 7 detects the presence of the synchronizing mark 8, and transmits a control signal for controlling the direction and amount of movement the compensating roller 6 to the compensating roller drive motor 30 via the motor drive circuit 31. Furthermore, the control unit 20 receives a rotational pulse representing the movement of the compensating roller 6 from the drive motor encoder 32 as a feedback signal for control.

Figure 4:
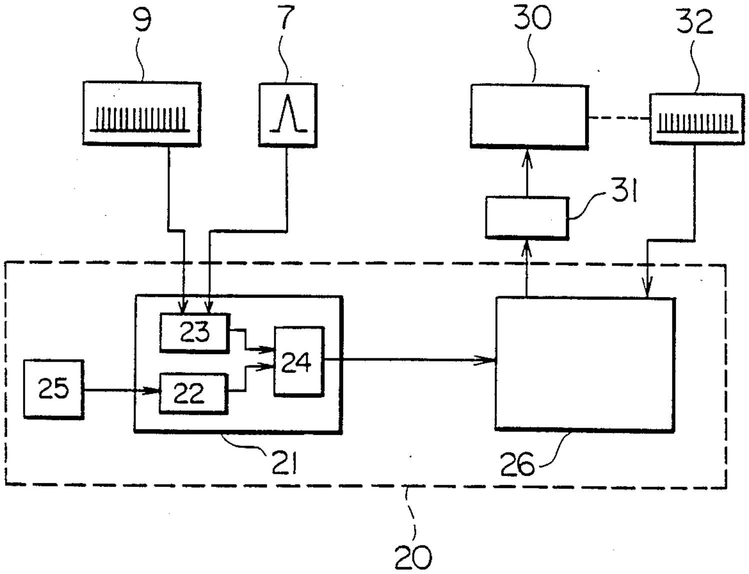
FIG. 4 is a lock diagram illustrating the operating principle of this, invention.

As shown in FIG 4, the control unit 20 consists of a comparing means 21 and a controlling means 26, the comparing means 21 comprising a reference value memory 22, a counter 23 and a difference value calculating means 24. The counter 23 of the comparing means 21 continues to count rotational pulses from the cutting cylinder encoder 9 until the synchronizing mark detecting means 7 detects the presence of the synchronizing mark 8. The count value (A) at that time is held by the counter 23. The difference calculating means 24 of the comparing means 21 calculates a the difference value (A−B) between the count value (A) held by the counter 23 and the reference value (B) stored in the reference value memory 22 for subsequent transmission to the controlling means 26. The reference value (B) stored in the reference value memory 22 is set in advance by the keying means 25. The resetting of the count value of the counter 23 is automatically performed when the cutting cylinder 4 is moved to a predetermined rotational angle. If the counter 23 is of a type that is automatically reset to zero upon completion of counting, the resetting is automatically realized. Therefore, the count value (A) varies according to a path length between the press unit and the synchronizing mark detecting means 7. That is, the count value (A) varies according to a path length between the press unit 50 and the cutting cylinder 4. The controlling means 26, on the other hand, drives the compensating roller drive motor 30 while using the rotational pulses from the drive motor encoder 32 as feedback signals, in accordance with the calculating results received from the difference calculating means 24.

Figures 7A, 7B, 7C:
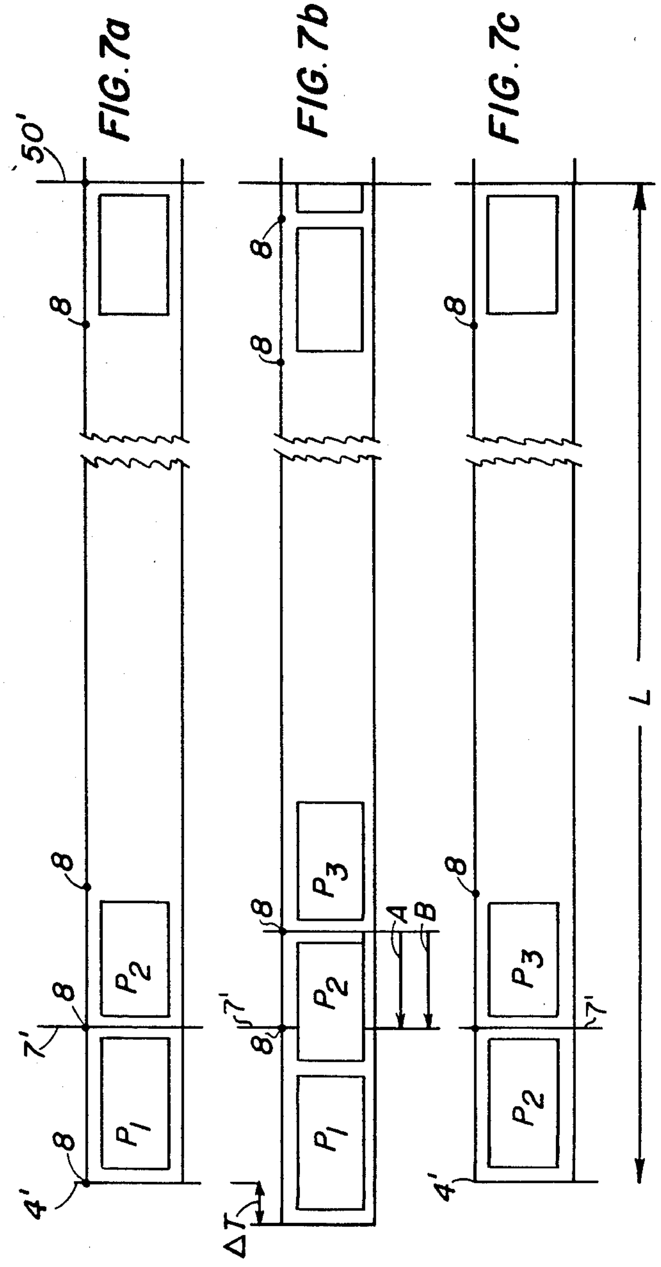

As seen in FIG. 7A through 7C, the counter 23 is re-set after a period Δ after the cutting operation such that a count value is generated from the re-setting point to the detection of the synchronizing mark by the detecting means 7 at detection point 7, at detection point 7. As can be seen in FIG. 7B, the reference value (B) is equal to the value (A) as shown graphically. Accordingly, the count value (A) will equal the count value (B) and no control step will be taken. In this case, the margins are correct and the margin will be in substantial alignment with the cutting line 4′ of the cutting element such that no change of web position relative to the printing location 50′ and cutting line 4′ are needed.

Figures 7D, 7E, 7F, 7G:
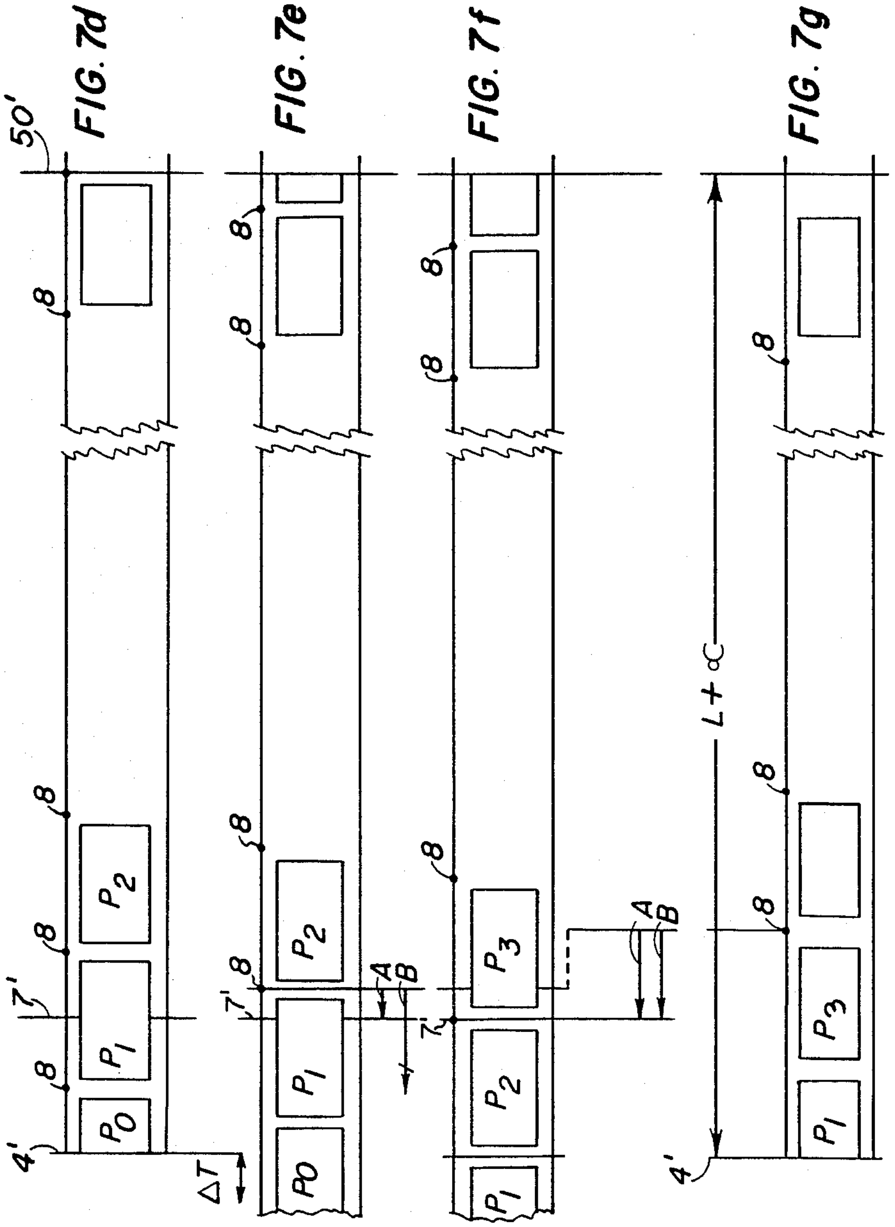

FIGS. 7D, 7E and 7F show a situation in which the count value (A) is much shorter than the reference value (B). In such a situation as shown in FIG. 7E after the counter is re-set, the marker will pass under the detecting means 7 such that the count value (A) does not equal the reference value (B) and the compensating roller 6 must be adjusted to alter the length of web between the cutting cylinder and the press unit appropriately so that the next margin will be in substantial alignment with the cutting line, as shown in FIG. 7F, and the count value (A) will then be equal to the reference value (B), as shown in FIG. 7G.

Next, the operation of this invention to be performed by the control unit 20 during each control cycle will be described, referring to the flow chart shown in FIG. 5.

As shown in Step 10, the counter 23 keeps waiting until the cutting cylinder encoder 9 reaches a predetermined rotational angle while counting generated rotational pulses. As the counting of rotational pulses proceeds and the cutting cylinder 4 reaches a predetermined rotational angle, the counter counts up, resetting the count value to zero. Next, the counter 23 continues counting rotational pulses from the cutting cylinder encoder 9 until the synchronizing mark detecting means 7 detects the presence of the synchronizing mark 8, as shown in Steps 30 and 40. When the synchronizing mark detecting means 7 detects the presence of the synchronizing mark 8, the counter 23 stops counting rotational pulses from the cutting cylinder encoder 9, latching the count value (A) at the time of synchronizing mark detection, as shown in Step 50.

When the counter 23 obtains the count value (A), the difference calculating means 24, which operates in synchronism with the counter 23, calculates the difference (A−B) between the count value (A) and the reference value (B) stored in the reference value memo-y 22 for transmission to the controlling mans 26, as shown in Step 60.

The reference value (B) represents the number of rotational pulses of the cutting cylinder encoder 9 that is to be counted by the counter 23 during the period from the moment at which the counter 23 is reset to the moment at which the synchronizing mark 8 is detected when the relative positions of the web 1 and the cutting cylinder 4 have been determined and the reference value (B) has been determined accordingly prior to the start of system operation so that the web 1 is cut by the cutter 5 to match the print surface, and input in advance by means of the keying means 25 at the start of system operation. Consequently, so long as the relative position of the web 1 and the cutting cylinder 4 remain the same as the relative positions set at the start of system operation even after the system is started operation A=B holds, and thus, the cutting operation matching the print pattern is effected. In other words, this inversion is not subjected to any limitations, except that the synchronizing mark detecting means 7 has to be installed in the downstream of the compensating roller 6, unlike the prior art.

Next, the controlling means 26 executes the processing of judging whether the difference x obtained in Step 60 ($x=A-B$) is 0, a positive value or a negative value, as shown in Step 70. If this processing determines that x=0, the web 1 is to be cut at the initially set normal positional relationship. Thus, system operation proceeds to Step 80 where the compensating roller 6 is not driven, holding the state at that moment.

If the processing determines $x<0$, the web 1 is to be cut at a position where the web 1 advances by $|x|$ from the initially set normal positional relationship. Thus, system operation proceeds to Step 90 where the controlling means 26 drives the compensating roller drive motor 30 so that the movement of the compensating roller 6 is increased by $|x|$. If the processing determines x>), on he other hand, then the web 1 is to be cut at a position where the web 1 lags by $|x|$ behind the initially set normal positional relationship. Thus, system operation proceeds to Step 100 where the controlling means 26 drives the compensating roller drive motor 30 so that the movement of the compensating roller 6 is reduced by $|x|$. Through the processings of Steps 90 and 100, the relative positions of the web 1 and the cutting cylinder 4 are returned to the normal positional relationship. This results in a cutting operation matching the print pattern.

The driving of the compensating roller drive motor 30 by the controlling means 26 is accomplished via the motor drive circuit 31. At the time of this driving control, the controlling means 26 receives the rotational pulses generated by the drive motor encoder 32 serving as a means for detecting the movement of the compensating roller 6. In other words, the controlling means 26 determines the movement of the compensating roller by counting the rotational pulses generated by the drive motor encoder 32. In this case, if the pulse pitches of the cutting cylinder encoder 9 and the drive motor encoder 32 are set so as to be the same amount in terms of the length of the web 1, the driving control of the compensating roller 6 is easily accomplished by subtracting the number of rotational pulses generated by the drive motor encoder 32 from the count value of the difference $|x|$ calculated by the difference calculating means 24, and stopping the compensating roller drive motor 30 when the subtracted remainder becomes zero.

As described above, this invention makes it possible to automatically adjust the cutting position of a web over the entire range where the compensating roller can be moved by eliminating the limitation associated with the prior art of the automatic adjustment of the cutting position within the width of gate signals. This invention, which does not rely on gate signals and enables the reference value to be set freely, can offer a highly practicable system that can freely select the mounting position of the synchronizing mark detecting means.

Figure 5:
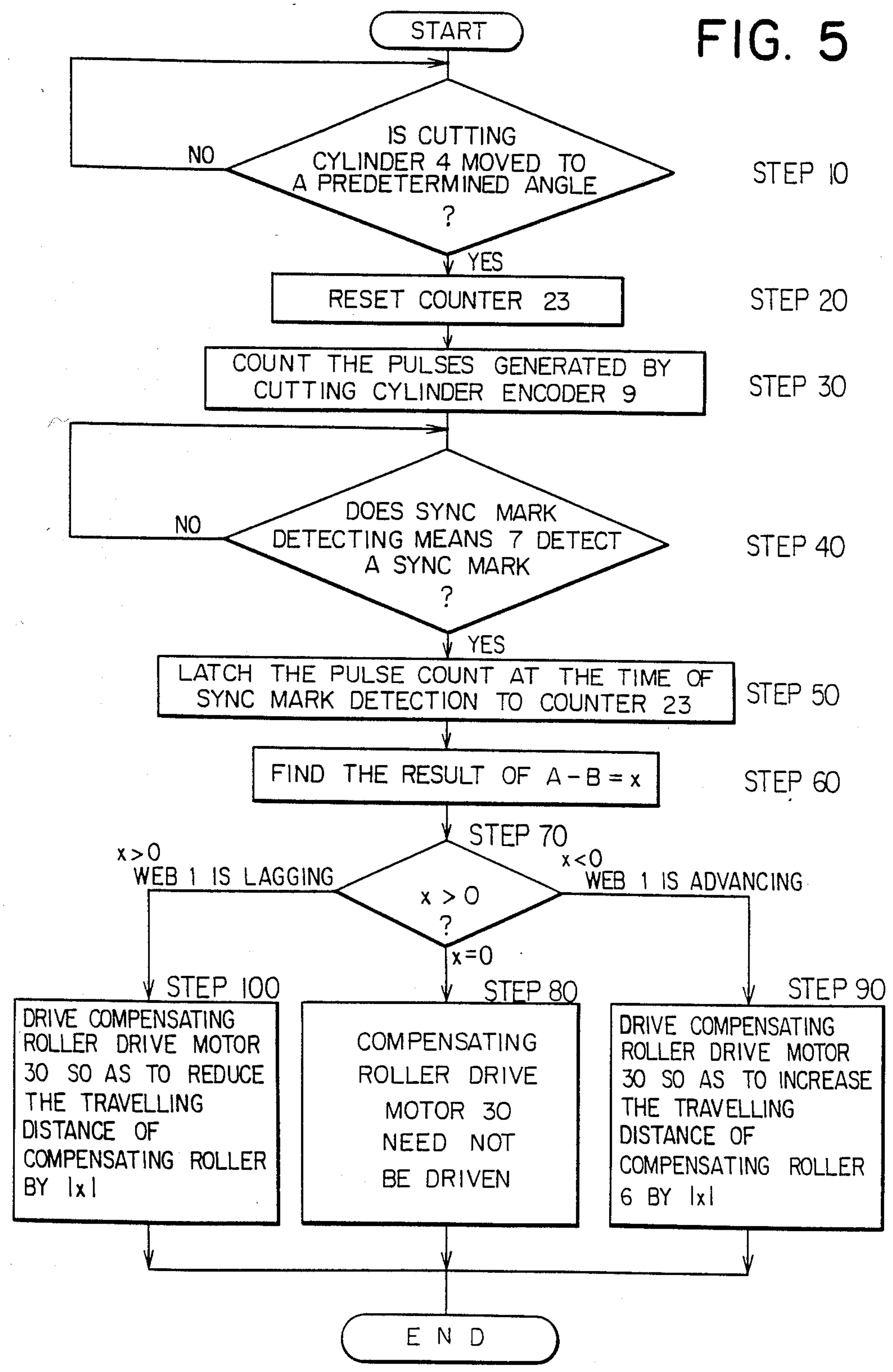
FIG. 5 is a flow chart of assistance in explaining the operation of this invention in accordance with the block diagram of FIG. 4.

In the embodiment disclosed in FIG. 5, Step 70 determines whether the difference value is zero or not. To avoid an unwanted hunting phenomenon, it is desirable to provide an appropriate tolerance for the calculation results of the value (B). Furthermore, it is also desirable to adopt an appropriate processing method in which the driving of the compensating roller is controlled only when the calculation results of the difference exceed this tolerance multiples of times.

Although a cutting cylinder is used as a cutting means in the embodiment shown in FIG. 1, this invention is not limited to this type of cutting means.

While specific embodiments of the invention have been shown and described in detail to illustrate the application of the principles of the invention, it will be understood that the invention may be embodied otherwise without departing from such principles.

What is claimed is:

1. A web cutting position control system comprising: cutting means for cutting a web that is running continuously including a rotating cutting cylinder arrangement;
   phase detecting means associated with said cutting means for outputting pulses corresponding to the rotational angle of the cutting cylinder arrangement;
   a compensating roller operatively engaged with the web and movable between a first position and a second position for changing the path length of the web relative to said cutting means;
   movement detecting means for detecting the movement and position of said compensating roller;
   synchronizing mark detecting means, installed downstream of said compensating roller for detecting each of a plurality of synchronizing marks provided on said web;
   counting means connected to said synchronizing mark detecting means and connected to said phase detecting means for counting the pulse output of said phase detecting means until said synchronizing mark detecting means detects one of said synchronizing marks on said web and outputting a signal representing the number of pulses counted;
   reference value memory means for storing in advance a reference value representing a number of pulses output by said phase detecting mean up to the sensing of one of said plurality of synchronizing marks for a predetermined preferred positional relationship between said cutting means and the web;
   comparing means for receiving said reference value and said count signal from said counting means and outputting a signal representing the value of the difference between said reference value signal and said count signal; and,
   controlling means for receiving said difference signal and for controlling the direction and amount of movement of said compensating roller dependent upon the value of said difference signal.

2. A web cutting system according to claim 1, wherein: said phase detecting means comprises an encoder and said movement detecting means comprises an encoder.

3. A web cutting system according to claim 1, wherein: said counting means comprises a counter.

4. A web cutting system according to claim 1, wherein: said control means controls the direction and amount of movement of said compensating roller on the basis of said difference signal only when the value of said difference signal is greater than a predetermined tolerance value.

5. A web cutting system according to claim 4, wherein: said control means controls the movement of said compensating roller only when the tolerance value is exceeded in multiples of times.

6. A web cutting system according to claim further comprising: a drag roller disposed upstream of said cutting means to continuously tension the web.

* * * * *